(12) United States Patent
Lee

(10) Patent No.: US 7,988,889 B2
(45) Date of Patent: Aug. 2, 2011

(54) MOLD FOR MOLDING LENSES AND METHOD FOR MAKING THE MOLD

(75) Inventor: Han-Lung Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 243 days.

(21) Appl. No.: 12/424,822

(22) Filed: Apr. 16, 2009

(65) Prior Publication Data

US 2010/0051780 A1 Mar. 4, 2010

(30) Foreign Application Priority Data

Sep. 3, 2008 (CN) .......................... 2008 1 0304348

(51) Int. Cl.
*B29C 59/00* (2006.01)
(52) U.S. Cl. ......... 264/2.5; 264/219; 264/220; 264/221; 264/222; 264/223; 264/224; 264/225; 264/226; 264/227; 264/2.1; 264/2.7; 425/404; 425/409; 425/412; 425/418; 425/470; 425/808; 249/114.1; 249/115; 249/134
(58) Field of Classification Search .................. 264/2.1, 264/2.5, 2.7, 219, 220, 293; 425/404, 409, 425/412, 418, 466, 470, 808; 249/114.1, 115, 134; 427/133
See application file for complete search history.

(56) References Cited

U.S. PATENT DOCUMENTS

| | | | | |
|---|---|---|---|---|
| 1,143,895 A | * | 6/1915 | Essick | 249/142 |
| 6,787,072 B2 | * | 9/2004 | Border et al. | 264/2.5 |
| 2009/0280417 A1 | * | 11/2009 | Louh | 430/30 |

* cited by examiner

*Primary Examiner* — Christina Johnson
*Assistant Examiner* — Saeed Huda
(74) *Attorney, Agent, or Firm* — Steven M. Reiss

(57) ABSTRACT

An exemplary method for making a mold used for molding lenses includes the following. First, a base is provided. The base has parallel lines marked on a surface thereof. Second, a dispenser is provided. The dispenser dispenses lumps of molding material on selected positions on the surface of the base guided by the lines. Third, a roller is provided. The roller has a peripheral side surface. The peripheral side surface has spaced molding surfaces defined thereat, each molding surface corresponding to a surface of a lens to be formed. The roller is applied above the base, with the molding surfaces press-molding the lumps of molding material, thereby forming molding portions on the base. Thus, a mold including the base and the molding portions formed on the base is obtained.

11 Claims, 5 Drawing Sheets

MOLD FOR MOLDING LENSES AND METHOD FOR MAKING THE MOLD

BACKGROUND

1. Technical Field

The present invention relates to molds, and particularly, to a mold used for molding a plurality of lenses and a method for making the mold.

2. Description of Related Art

Currently, camera modules are widely applied in a variety of portable electronic devices such as mobile phones. Most portable electronic devices are becoming progressively miniaturized over time, and thus camera modules, including the lenses thereof, are correspondingly becoming smaller and smaller. Such lenses are typically small and light in weight.

Molds for molding lenses are usually made by etching. However, because many modern lenses are small, the molding surfaces of the molds need to be correspondingly small. As such, it is difficult to accurately etch the molding surfaces on such molds. In addition, generally speaking, an efficiency of the etching method is low.

What are needed, therefore, are a mold used for molding a plurality of lenses, and a method for making the mold, which can overcome the above described shortcomings.

BRIEF DESCRIPTION OF THE DRAWINGS

Many aspects of the present mold and method can be better understood with reference to the following drawings. The components in the drawings are not necessarily drawn to scale, the emphasis instead being placed upon clearly illustrating the principles of the present mold and method. Moreover, in the drawings, like reference numerals designate corresponding parts throughout the several views.

DETAILED DESCRIPTION OF EMBODIMENTS

Figure 1:
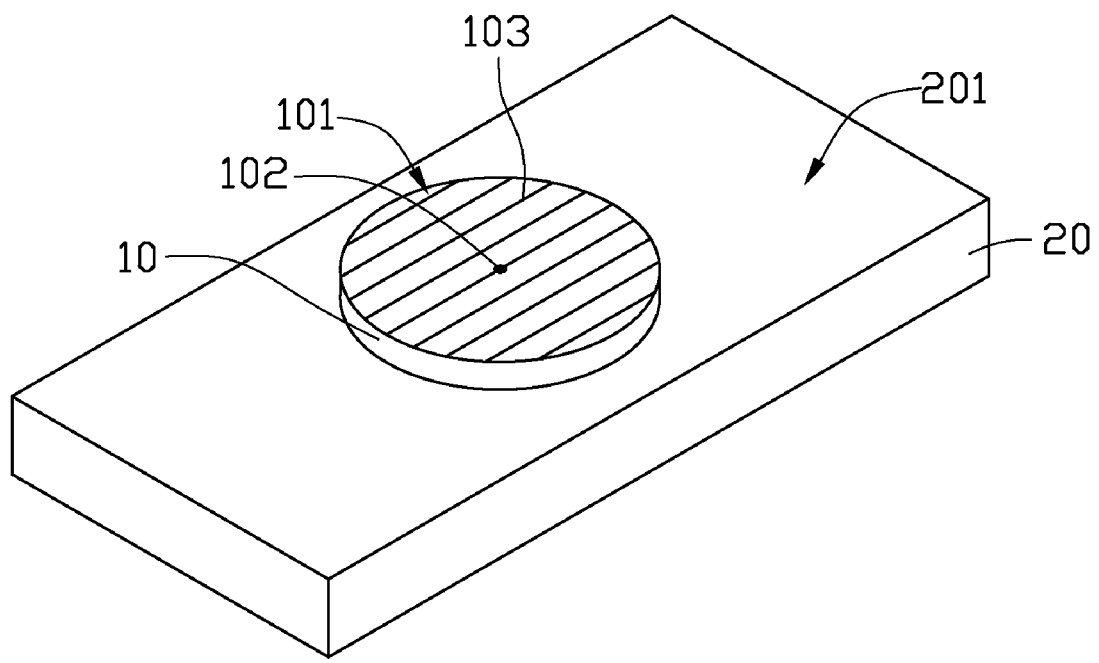
FIG. 1 is a schematic view showing a worktable and a base used in a method for making a mold for molding a plurality of lenses, in accordance with an exemplary embodiment of the present invention.

Embodiments of the present mold and method will now be described in detail below and with reference to the drawings.

Referring to FIGS. 1 to 5, these show successive stages in an exemplary method for making a mold 100 for molding a plurality of lenses (not shown), in accordance with an exemplary embodiment. The mold 100 includes a base 10, and a plurality of molding portions 50 formed on the base 10. A rigidity of the base 10 is greater than that of the molding portions 50. The method includes steps as follows:

First, a base 10 is provided. In the present embodiment, the base 10 is or comprises quartz, and is disk-shaped. The base 10 has a flat top working surface 101. The working surface 101 has a plurality of parallel lines 103 marked thereon. The lines 103 are equally spaced apart from each other, and can be wiped away after the mold 100 has been made. The base 10 is positioned on a worktable 20. More particularly, a center 102 of the base 10 is marked on the working surface 101. Thus the base 10 can be more easily correctly positioned by aligning the center 102 with a center (not shown) of a top surface 201 of the worktable 20.

Figure 2:
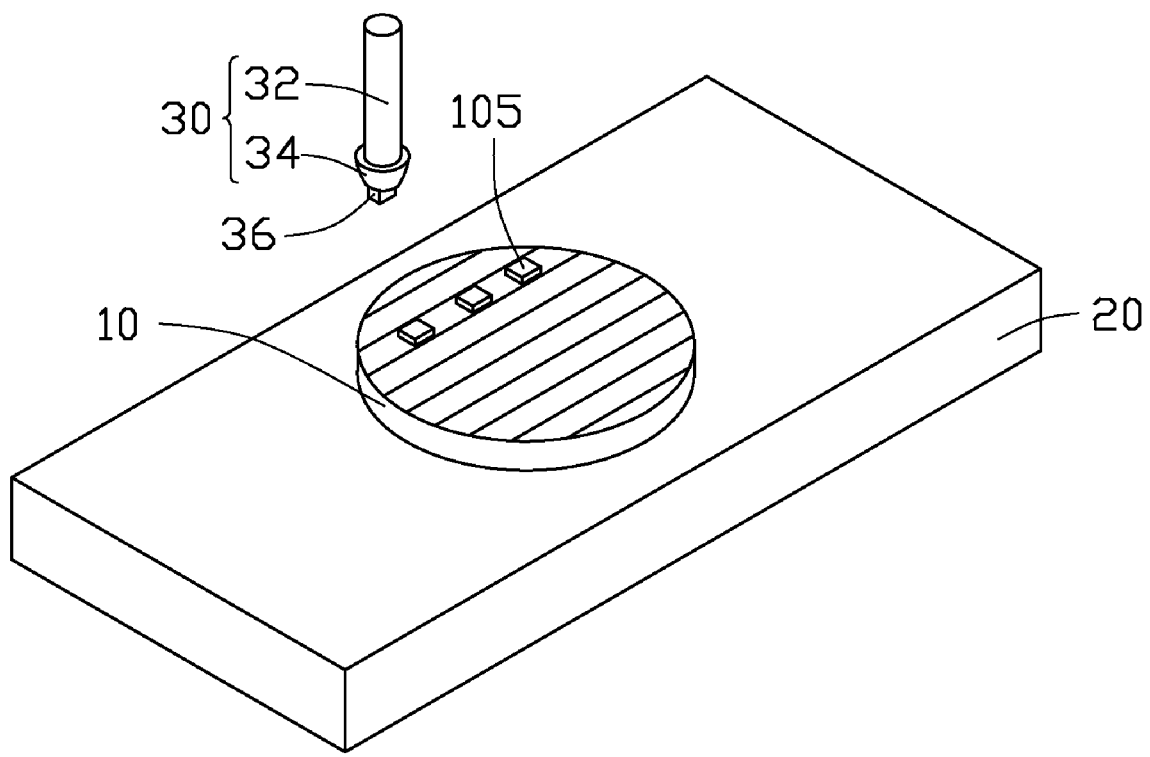
FIG. 2 is a schematic view showing a dispenser dispensing a first plurality of lumps of molding material on the base of FIG. 1.
Figure 3:
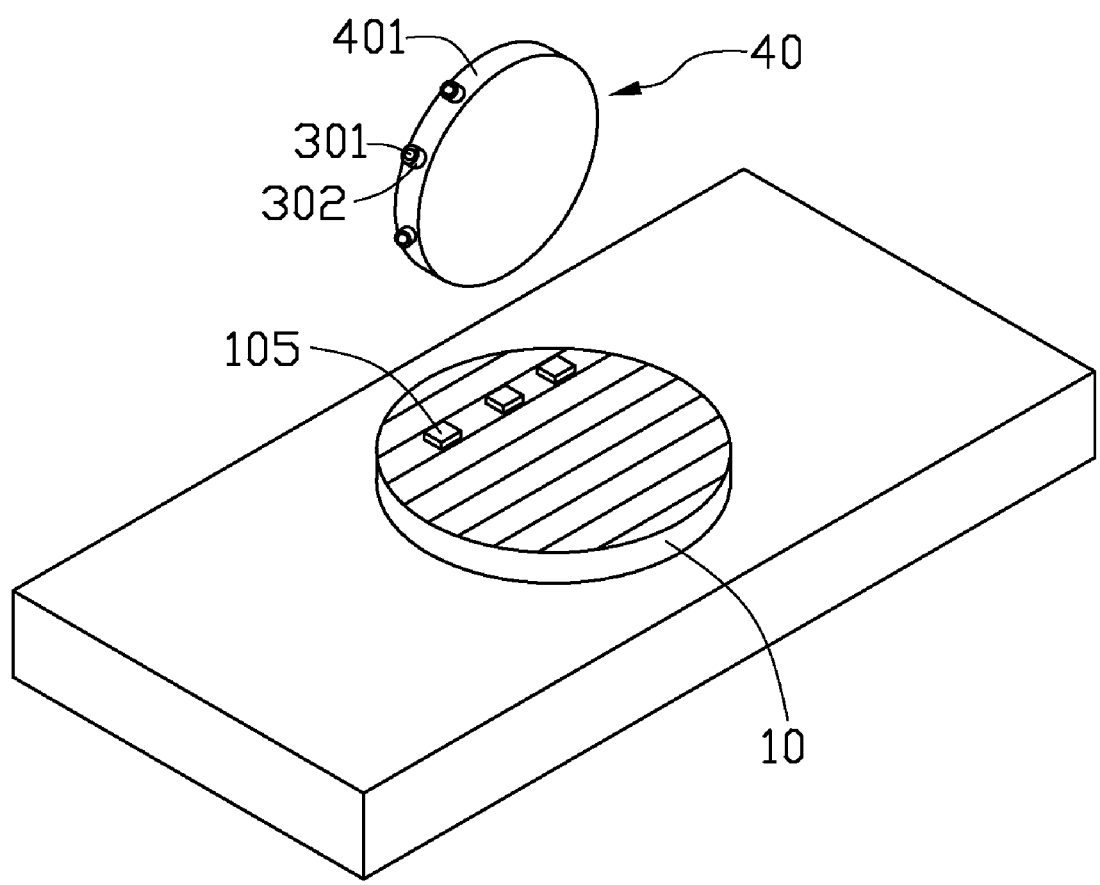
FIG. 3 is a schematic view showing a roller having molding surfaces defined on stampers thereof, the stampers ready for press-molding the lumps of molding material of FIG. 2.
Figure 4:
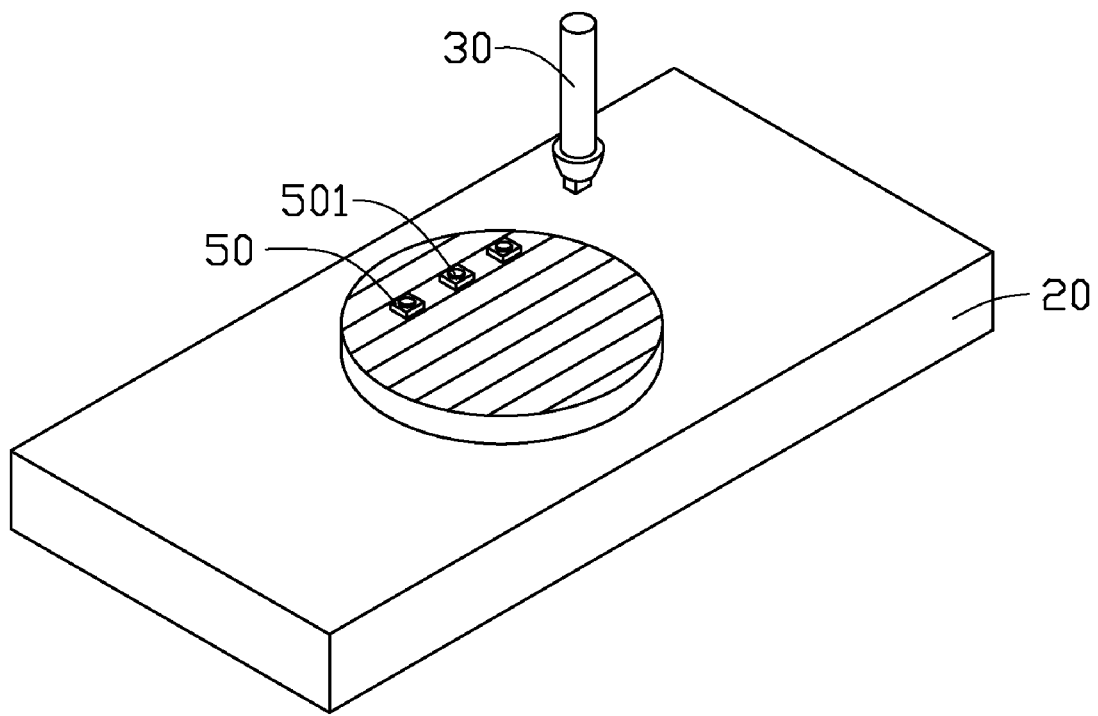
FIG. 4 a schematic view showing a first plurality of molding portions press-molded from the first plurality of lumps of molding material, and also showing the dispenser of FIG. 2 ready for dispensing a second plurality of lumps of molding material on the base.
Figure 5:
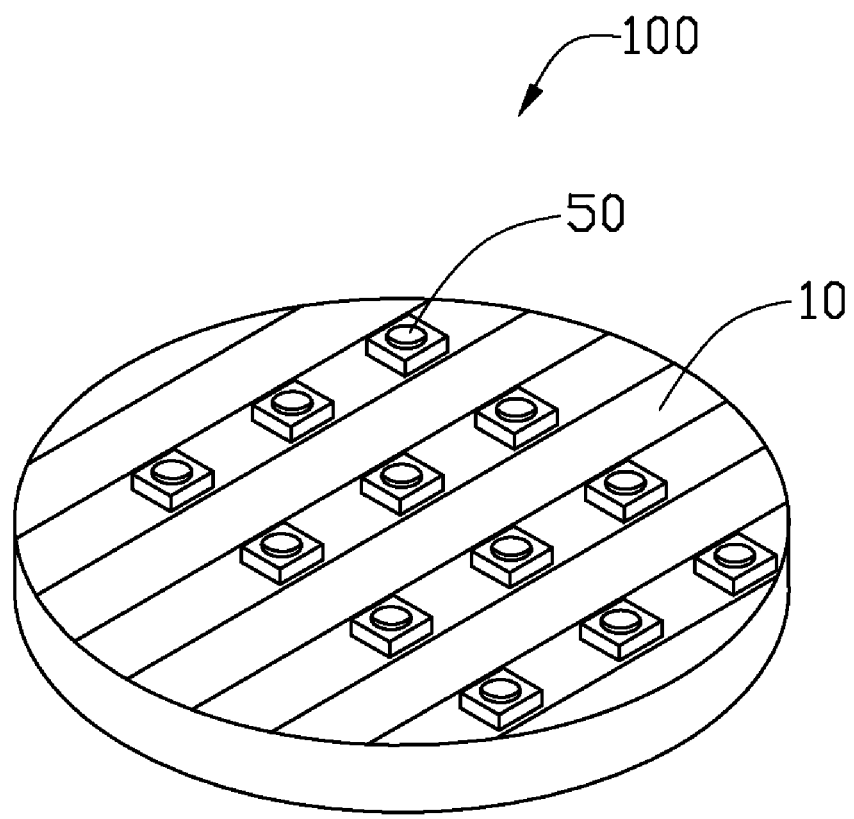
FIG. 5 is an enlarged view of the mold for molding a plurality of lenses, made in accordance with the exemplary embodiment.

Second, a dispenser 30 is provided. The dispenser 30 has a container 32 for containing molding material, and a nozzle 34 communicating with the container 32 and the exterior. In the present embodiment, the molding material mainly contains silicone. The silicone may contain additives. The nozzle 34 has a square-shaped opening (not visible) at a bottom end thereof. In FIG. 2, a corresponding square-shaped mass (or body) of molding material 36 can be seen extruding from the bottom of the nozzle 34. A transverse width of the opening is equal to or smaller than the spacing between the lines 103. When a pressure is applied to the container 32, the nozzle 34 is capable of dispensing a plurality of the masses of molding material 36 through the opening onto predetermined positions between two selected adjacent lines 103, thus providing lumps of molding material 105 on the working surface 101. The dispensed lumps of molding material 105 are in a soft state that can be easily molded, but do not flow or spread without the application of external pressure. In the illustrated embodiment, the dispenser 30 dispenses three lumps of molding material 105 in a row in the space between the second-left line 103 and the third-left line 103.

Third, a roller 40 is provided. The roller 40 is in the form of a drum, and has a circular side surface 401. A width of the circular side surface 401 is slightly smaller than or equal to the spacing between the lines 103. A plurality of stampers 302 are formed on the circular side surface 401. In the illustrated embodiment, the stampers 302 protrude from the circular side surface 401, and are evenly spaced apart. Each of the stampers 302 is fixed in a predetermined hole (not labeled) formed in the circular side surface 401. Alternatively, the stampers 302 and the circular side surface 401 of the roller 40 can be integrally formed as a single body of material. In the present embodiment, there are three stampers 302. Each of the stampers 302 has a molding surface 301 corresponding to a surface of a lens to be molded. In the present embodiment, the molding surfaces 301 are convex. In other embodiments, the molding surfaces 301 can be concave. In such cases, the concave surfaces can be directly formed as recesses in the circular side surface 401. That is, the stampers 302 can be omitted.

The roller 40 is applied just above the base 10, with the molding surfaces 301 press-molding the lumps of molding material 105. Thereby, a plurality of molding portions 50 is formed in the space between the second-left line 103 and the third-left line 103. In the present embodiment, each of the molding portions 50 has a concave surface 501 corresponding to the respective molding surface 301.

During the press-molding step using the roller 40, ultraviolet (UV) light can be applied to the lumps of molding material 105 to solidify the molding portions 50. Thus, the molding portions 50 are adhered to the working surface 101 of the base 10. The silicone of the molding material is easily solidified, and can easily firmly adhere to the quartz of the base 10.

Then the dispensing step using the dispenser 30, the press-molding step using the roller 40, and the solidifying step are repeated to make a plurality of molding portions 50 along a next selected row. In the present embodiment, the next selected row is in the space between the fourth-left line 103 and the fifth-left line 103.

By this method, the mold 100 including the base 10 and the molding portions 50 formed on and adhered to the working surface 101 of the base 10 can be obtained.

The mold 100 can be directly used for press-molding a plurality of lenses each of which has only one optical surface (usually a curved surface). A second mold 100 can be also applied. In such case, for example, two symmetrically opposite molds 100 can be used. Thereby, a plurality of lenses each of which has two symmetrically opposite optical surfaces can be molded. The base 10 has great rigidity. Accordingly, the base 10 is capable of supporting the molding portions 50 and as well as the lenses, and can be freely moved about in a manufacturing facility with little or no risk of damage. The molding portions 50 have less rigidity than the base 10. Accordingly, the molding portions 50 can easily and fully contact a material used for the lenses, such as polymethyl methacrylate (PMMA). As such, during molding of the lenses, a molding temperature of the material of the lenses can be lowered. Furthermore, the silicone of the material of the molding portions 50 can easily separate from the PMMA once the lenses have been formed.

It is understood that the above described embodiments and methods are intended to illustrate rather than limit the disclosure. Variations may be made to the embodiments and methods without departing from the spirit of the invention. Accordingly, it is appropriate that the appended claims be construed broadly and in a manner consistent with the scope of the invention.

What is claimed is:

1. A method for making a mold used for molding a plurality of lenses, the method comprising:
    providing a base having a surface;
    marking a plurality of lines on the surface of the base;
    providing a dispenser and using the dispenser to dispense a plurality of lumps of molding material on selected positions on the surface of the base guided by the lines;
    providing a roller, the roller having a peripheral side surface, the peripheral side surface having a plurality of spaced molding surfaces defined thereat, each molding surface corresponding to a surface of a lens to be molded; and
    applying the roller above the base, with the molding surfaces press-molding the lumps of molding material, thereby forming a plurality of molding portions on the surface of the base.

2. The method of claim 1, further comprising dispensing another plurality of lumps of molding material on selected positions on the surface of the base guided by the lines and press-molding the another plurality of lumps of molding material using the roller, thereby forming another plurality of molding portions on the surface of the base.

3. The method of claim 1, wherein the surface of the base is flat, the lines on the surface are parallel to each other, and a width of the peripheral side surface of the roller is no greater than a spacing between two adjacent of the lines.

4. The method of claim 3, wherein the width of the peripheral side surface is equal to the spacing between two adjacent of the lines.

5. The method of claim 1, wherein the dispenser has an opening for dispensing the lumps of molding material, a width of the opening being equal to or smaller than a spacing between two adjacent of the lines on the surface of the base.

6. The method of claim 1, wherein the base comprises quartz, and the molding material comprises silicone.

7. The method of claim 1, wherein the lumps of molding material dispensed on the surface of the base are soft but cannot flow or spread without application of external pressure, and the method further comprises solidifying the molding portions on the base.

8. The method of claim 1, further comprising providing a worktable and positioning the base on the worktable.

9. The method of claim 1, wherein the molding surfaces are convex surfaces each protruding from the peripheral side surface of the roller, and the molding portions each have a concave surface, the concave surfaces corresponding to the convex molding surfaces.

10. The method of claim 1, wherein the molding surfaces are concave surfaces each recessed in the peripheral side surface of the roller, and the molding portions each have a convex surface, the convex surfaces corresponding to the concave molding surfaces.

11. The method of claim 1, wherein the peripheral side surface of the roller is a circular side surface.

* * * * *